United States Patent [19]

McGrath

[11] 4,062,376
[45] Dec. 13, 1977

[54] SERVICE CONNECTION BETWEEN A MAIN AND A METER IN A BUILDING AND METHOD OF AND EQUIPMENT FOR INSTALLING THE SAME

[76] Inventor: Robert L. McGrath, Hollis St., East Pepperell, Mass. 01437

[21] Appl. No.: 610,565

[22] Filed: Sept. 5, 1975

[51] Int. Cl.² ............................................. F16K 23/00
[52] U.S. Cl. .................................... 137/312; 137/364; 138/114; 73/49.1
[58] Field of Search ................ 137/312, 320, 364, 366; 138/113, 114; 73/40.5 R, 49.1, 49.8

[56] References Cited

U.S. PATENT DOCUMENTS

| | | | |
|---|---|---|---|
| 319,765 | 6/1885 | Westinghouse | 137/366 |
| 2,155,340 | 4/1939 | Stroud | 137/312 |
| 2,217,330 | 10/1940 | Buttner | 137/364 X |
| 3,299,417 | 1/1967 | Sibthorpe | 138/114 X |
| 3,338,254 | 8/1967 | Regal | 137/312 X |
| 3,436,197 | 4/1969 | Borst | 137/312 X |
| 3,531,264 | 9/1970 | Greipel | 137/312 X |
| 3,724,204 | 4/1973 | Matthews | 138/113 X |
| 3,799,440 | 3/1974 | Goss | 138/114 X |

Primary Examiner—Harold W. Weakley

[57] ABSTRACT

A service connection between a water main and a meter within a building has a service conduit within a leakage conduit. The leakage conduit has a sealed connection with a casing sealed to the main and enclosing a corporation stop to which the service conduit is connected. The leakage conduit is sealed to the service conduit within the building and adjacent the meter and includes an outlet extending outwardly through the building wall above the ground so that leakage within the corporation casing or a leak in the service conduit may be quickly detected. In the event of a leak, the service conduit may be removed and replaced through the leakage conduit with excavation limited to exposing the corporation casing and the end of the leakage conduit connected thereto. A snake provided with a flexible wedge that includes connections with an existing service conduit and a leakage conduit to be installed enables the former to be withdrawn and the latter simultaneously to be pulled through the ground to effect its installation. The flexible wedge may be double ended with a cable connected to each end.

1 Claim, 5 Drawing Figures

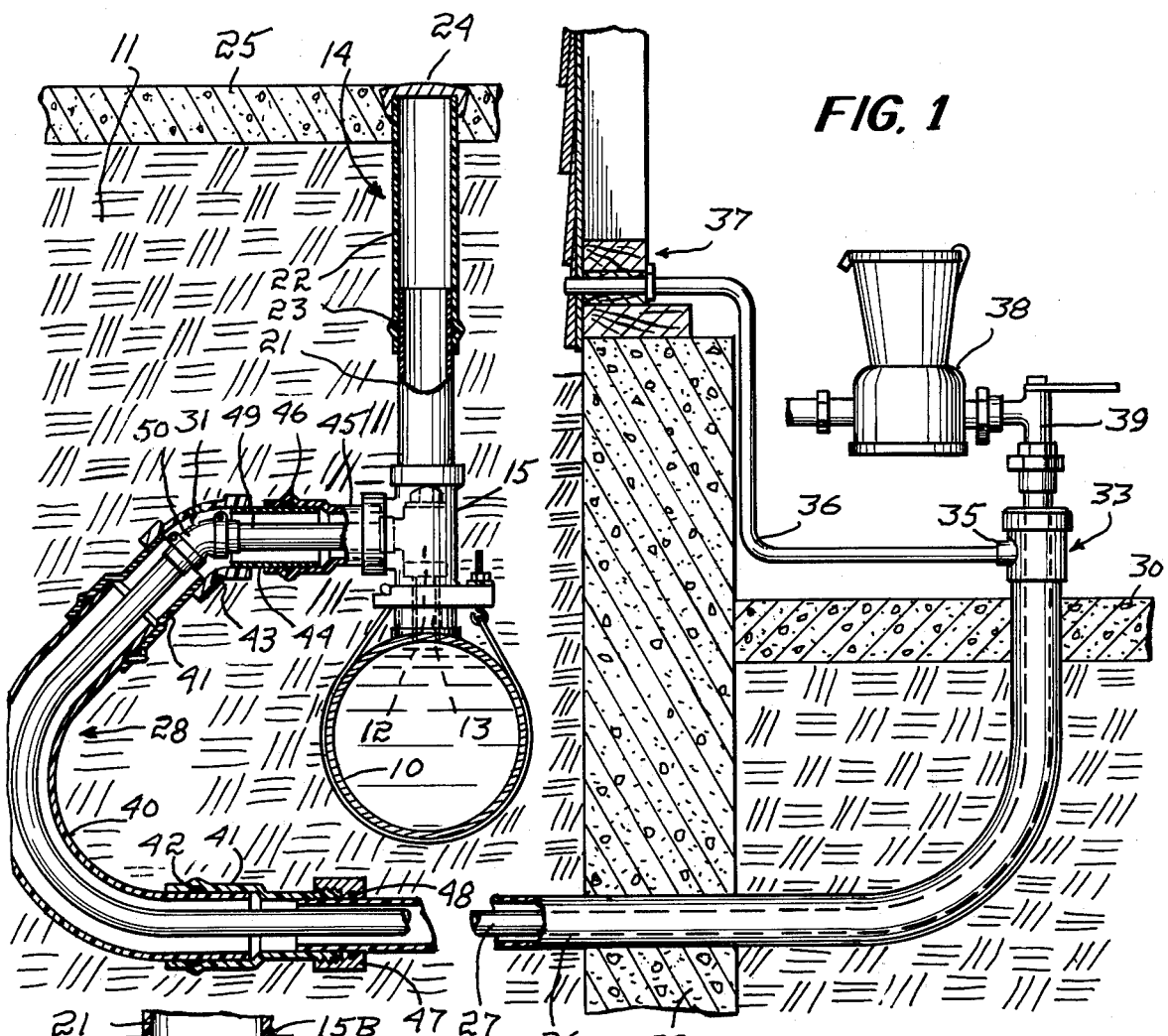

SERVICE CONNECTION BETWEEN A MAIN AND A METER IN A BUILDING AND METHOD OF AND EQUIPMENT FOR INSTALLING THE SAME

BACKGROUND OF THE INVENTION

One of the many duties of a municipal water department is the elimination of leaks in mains or, more commonly, in service conduits between the mains and a meter within a building. It is well known in the field of water department management that sometimes several years pass before leaks in service conduits are discovered. Leaks that go undetected for long periods can cause losses of thousands of dollars.

A service conduit leak also makes it possible for drinking water to be contaminated. Fire apparatus drawings or main shut-offs are examples of situations when a vacuum can be drawn and if the service conduit is in the field of a defective sewer line or sewage, contaminated water may then be drawn into it.

In addition, repair of such leaks entails substantial costs as presently it is necessary not only to excavate until the main is exposed but also to dig a trench from the main to the curbstop and often to the building to enable the service conduit to be replaced. It will be appreciated that digging such a trench is an objectionable, though presently a necessary procedure, both because of the cost and because, when the trench must extend beyond the curbstop, lawns and shrubbery are disturbed and damaged, at least temporarily and often permanently.

THE PRESENT INVENTION

The general objective of the present invention is to provide an underground branch conduit that is connected to an underground main conduit and to provide a "tell-tale" should leakage occur in the branch or at its connection with the main conduit which is typically but not necessarily a water main and the branch conduit a service conduit between the main and a meter within a building. The invention is discussed with particular reference to such a service connection for water.

In accordance with the invention, this general objective is attained with a service connection having a stop in control of an outlet from the main and within a closed casing or box sealed to the main. A flexible leakage conduit in communication with the interior of the casing has a sealed connection therewith and extends underground to and, at least in the case of a service connection for water, into the building adjacent a meter and a flexible service conduit, connected to the outlet of the stop extends freely through the leakage conduit and is connected to the meter through a shut-off valve. The leakage conduit is sealed to the service conduit within the building and below the shut-off valve and has an outlet extending through the wall of the building where any water flowing through will soon be noticed, any such flow resulting from leakage entering the leakage conduit. When the service connection is for gas, it is preferred that the leakage conduit be sealed to the service conduit close to but outside the building with the leakage conduit outlet extending directly above ground.

Desirably, the casing extends upwardly with a removable cover exposed in the pavement so that it may be opened to permit the stop to be turned to open or close the service conduit thus enabling the usual curbstop to be eliminated.

In the event of leakage, an excavation is made only to so expose the casing and the connection of the leakage conduit therewith as to permit the ends of the leakage conduit to be detached therefrom and the service conduit detached from the stop. The service conduit is also detached from the shut-off valve and from the leakage conduit within the building so that it may be readily pulled through the leakage conduit and a new service conduit pushed through it thus to enable the leakage to be stopped without digging a trench between the main and the building. It will be appreciated that the leakage conduit may also be used to circulate air or warm water the entire underground length of the service conduit should a freeze up occur, requiring only that the corporation casing be opened to permit the escape of air delivered as by a compressor, into the leakage conduit via its outlet or water to be blown therefrom in the event warm water is first pumped into the leakage conduit outlet.

Another objective of the invention is to enable an existing underground flexible, tubular conduit to be installed or an existing such conduit to be replaced, once its ends are freed, with a like conduit that may be and typically is of a larger diameter without excavating the existing conduit.

In terms of method, this objective is attained by utilizing an underground flexible member, a cable, an existing flexible conduit, or a snake extending through such a conduit with its leading and trailing ends exposed, connecting the smaller end of a flexible wedge to the trailing end of the flexible member or members and the other end of the flexible wedge to a second member that may be a flexible tubular conduit of a larger diameter than the existing member or a cable and so pulling a first named member as to simultaneously move the thus coupled members through the earth and to compact the earth radially between their proximate ends. In the case where the second member is a tubular conduit, the larger end of the flexible wedge is connected thereto. When back and forth movements of the interconnected members are necessary, the flexible wedge is double ended so that the second member also has a small end connected thereto.

In terms of equipment, the flexible wedge includes a flexible connector attachable to a snake and to the underground and second members and provided with means at each end attachable to the trailing end of the existing member, the other at the opposite or trailing end of the element attachable to the leading end of the second member and a series of balls diametrically supported by the flexible element and increasing in diameter from the leading to that part of the wedge that is to be of maximum diameter. In its preferred embodiments, the wedge includes a second series of balls diametrically supported by the flexible element, one between each ball of the first series, the diameter of the balls of the second series such that throughout most of the length of the wedge, the balls of the first series are spaced apart by a ball of a lesser diameter.

Where the second member is a flexible tubular conduit, the leading end thereof is connected to the larger end of the flexible wedge and typically the diameter of the tubular conduit is greater than that of the first named member. Where the second member is a cable, the wedge is double ended with the trailing end thereof of the same construction and usually the same dimensions as its leading end. With both ends of such a wedge connected to the proximate ends of the members, earth compacting results in whichever direction wedge is pulled with back and forth pulling of the two members often desirable.

BRIEF DESCRIPTION OF THE DRAWINGS

Preferred embodiments of the invention are illustrated by the drawings and

FIG. 1 is a vertical section, broken away to foreshorten the drawing, of an installation in accordance with one embodiment of the invention;

FIG. 2 is a vertical section, on an increase in scale, of the corporation casing, the corporation stop and its connection with the main and the meter conduit;

FIG. 3 is a vertical section taken through the leakage conduit and its sealed connection with the service conduit;

FIG. 4 is a fragmentary view showing means for installing a tubular conduit by pulling it through the ground by an existing underground member or members to which it is connected by a flexible wedge; and FIG. 5 is a like view but with the flexible wedge of the double-ended type for use where the underground member is a cable.

THE PREFERRED EMBODIMENT OF THE INVENTION

In the drawings, the invention is shown as a service connection from a water main 10 shown as located at an appropriate depth in a roadbed 11, usually close to a side thereof and provided with a corporation stop 12 in control of an outlet 13 with which the main 10 is provided.

The corporation stop 12 is within a casing or box, generally indicated at 14 and shown as including a tee 15 having, see FIG. 2, flanged, internally shouldered ports 15A, 15B, and 15C. A short sleeve 16 is seated on a seal 16A surrounding the outlet 13 and is a friction fit within the port 15A the flange of which has one end of a strap 17 secured thereto and a diametrically located bore 18 receiving an anchoring screw 19 after the strap 17 has been passed under the main 10. A nut 20 threaded on the screw 19 ensures that the tee 15 is securely sealed in place but readily detached from the main 10. The casing 14 includes a longer sleeve 21 the lower end of which is a friction fit in the port 15B and its upper end is a sliding fit within a sleeve 22 having a seal 23 in its lower end and its upper end closed by a removable cap 24. The telescopingly connected sleeves 21 and 22 ensure that the length of the casing 14 may be adjusted to position the cap 24 level with the pavement 25 and later of pavement extended somewhat if another layer is later added. With the cap 24 removed, the stop 12 can be turned into the open or closed positions by means of a conventional shut-off rod and, accordingly, the usual curbstop is no longer necessary.

The service connection includes a flexible leakage conduit 26 and a flexible service conduit 27 of a sufficiently smaller diameter to fit freely within and extend through the leakage conduit. The leakage conduit 26 has a sealed connection, generally indicated at 28, with the casing 14 and extends underground from the main 10 through the foundation wall 29 of a building, typically upwardly through the cellar floor 30. The service conduit 27 has at one end a sealed connection generally indicated at 31 with the outlet port of the stop 12 and its other end extends through a seal 32 in a cap 33 secured to and closing the end of the leakage conduit 26 that is within the building, the cap having a seal 34 in contact with the leakage conduit below a laterally disposed outlet 35 to which a leakage discharge or outlet conduit 36 is connected, the conduit 36 extending outwardly through the wall 37 of the building. The service conduit 27 is connected to a water meter 38 through a shut-off valve 39. Desirably the diameter of the leakage conduit is about twice that of the service conduit and each is an appropriate length of a plastic tubing, polyvinyl chloride by way of example and not of limitation.

Before detailing the conduit connections 28 and 31, reference is made to the operation of the service connection. Should a leak develop in any place with which the leakage conduit 26 is in communication, leaking water will flow therethrough, through the outlet conduit 36 which being above ground, extending outside the building and desirably located where any flow would be shortly noticed, would lead to a prompt repair.

Such a repair is easily effected since with the stop 12 turned into its closed position, the only excavation needed is that to expose the casing 14 and the connection 28. Should it then appear that the leak is in the service conduit 27, the service conduit is disconnected from the shut-off valve 39 and the connection 28 separated to expose the connection 31. With the service conduit 27 detached from the connection 31, it may be then pulled through the leakage conduit 26 and its replacement then pushed therethrough with its ends then secured to the shut-off valve 39 and the connection 31 after which the connection 28 is then restored. While the service conduit 27 and its replacement may be pulled through the seal 32, it is preferred that with the defective service conduit disconnected from the shut-off valve 39, the cap 33 be first detached and pulled from the detached end of the service conduit and replaced when the replacement service conduit is in position.

The connection 28 between the leakage conduit 26 and the port 15C of the tee 15 is shown as including a U-shaped section consisting of a flexible tubular portion 40 the diameter of which is greater than that of the leakage conduit 26 and the ends of which fit adapters 41 provided with seals 42. One adapter 41 is releasably sealed in one end of a short section of flexible tubing 43 bent to provide an elbow in the other end of which there is a sleeve 44 slidably fitting an adapter 45 provided with a seal 46 and sealed in the port 15C. The other adapter 41 has a ring 47 threaded thereon through which the leakage conduit 26 extends and provided with a seal 48. The connection 31 includes the short outlet pipe 49 of the stop 12 and provided with an elbow 50 attached thereto and the service conduit 27 is detachably connected to the elbow 50 as by a packed joint.

Other connections between the service conduit and the stop 12 and between the leakage conduit and the casing port 15C may be used provided they permit the service connection to be disposed relative to the main 10 as the installation requires and provided the connection 28 can be separated to expose the connection 31 and then restored. With the connection 28 as shown, the adapter 41 is separated from the elbow-forming tubing 43 to so expose the elbow 50 that the service conduit 27 may be freed therefrom. The tubular portion 40 may then be disconnected from the leakage conduit so that the service conduit 27 can be pulled free if its other end is free in the building. After the new service conduit 27 has been pushed through the leakage conduit and sealed to the elbow 50, any removed portion of the connection 20 is slipped over the proximate end of the replacement service conduit 27 and the adapter 41 and the section 43 are again sealed together. The excavation may then be filled. Within the building it is necessary only to slip the cap 33 over the end of the new service conduit 27 and onto the end of the leakage conduit 26 and connect that end of the service conduit 27 to the shut-off valve 39.

While it is apparent from the foregoing that service conduits can be removed and replaced quickly and easily without digging a trench between a water main and a building, it is equally desirable to be able to replace an existing service conduit with a service connection in accordance with the invention or to install such a service connection.

In the case where there is an existing service conduit 27, a snake 51, see FIG. 4, may be used to withdraw the existing conduit 27 and to pull a larger, leakage conduit 26 through the ground.

In order that the above objective may be attained, it is, of course, necessary to make an excavation exposing the main 10 and the end of the existing service conduit in communication therewith and to free the other end thereof from the shut-off 39 and the basement floor and walls. With the stop 12 closed and the service conduit disconnected from the main 10, the snake 51, which is dimensioned to extend freely through the existing service conduit with its ends exposed, is inserted therethrough.

At the exposed, trailing end of the snake 51 there is provided a flexible wedge, generally indicated at 52. The flexible wedge 52 includes a flexible member 53 shown as having an eye 54 at its leading end by which it is detachably connected to the trailing end of the snake 51 and, rearwardly of the eye 54, there is a forwardly opening cup 55 axially connected to the member 53 and dimensioned to receive within it the trailing end of the existing service conduit 27. At its other end, the flexible member 52 has a stop 56 holding thereon a rearwardly opening, internally threaded cup 57 dimensioned to be threaded on the leading end of the leakage conduit 26 that is to be installed and to be further connected thereto as by a pin 58. While it is sometimes possible to connect a flexible wedge 52 directly to the trailing end of the existing service conduit 27 and use that conduit as the member by which the leakage conduit 26 may be pulled through the ground, the use of a snake is preferred.

In between the cups 55 and 57, there is a first series of balls 59, each shown as separated from the others by a ball 60 of a second series, the balls of both series having diametrically disposed bores through which the flexible member 52 extends. The balls 60 are shown as all of the same size while the balls 59 of the first series increase in size from the leading to the trailing end of the flexible wedge 52. The maximum diameter of the ball adjacent the leading end of the wedge 52 is not materially greater than that of the trailing end of the service conduit 27 and that at the trailing end of the flexible wedge 52 is close to that of the leakage conduit 26 that is to be installed.

With the service conduit 27 and the leakage conduit 26 to be installed connected to the ends of the flexible wedge 52, the two conduits are moved through the ground when the snake 51 is pulled with the ground between their proximate ends being radially compacted with the rate at which the conduits may be moved depending in part on the nature of the soil. While annular grooves would be provided in the flexible wedge 52 by the first series of balls, the use of the second series of balls 60 not only increases the axial extent of such grooves but also their depth as the diameter of the balls 59 increases. Once the leakage conduit 26 is in place, the removed service conduit 27 or a replacement therefor may be pushed therethrough and connected to the stop 12 and the shut-off valve 39 and the installation completed in the manner previously described.

It is sometimes possible to install a service conduit 27 by first using a water jet to form an underground passageway enabling a cable 61 to be pushed through the ground. In order that such a procedure may be more effective in installing a leakage conduit, a double-ended wedge is provided.

Such a wedge is generally indicated at 52A and as its construction is generally similar to that of the flexible wedge 52, corresponding parts are not again detailed but are identified by the suffix addition A to the appropriate reference numerals except in the case of the balls of the trailing wedge portion which are distinguished by the suffix addition B. In this embodiment of the invention, the trailing end of the wedge 52A is connected to a second cable 62 so that once the cable 61 has been forced through the ground, the passageway may be enlarged to accommodate a leakage conduit 26 by pulling first one cable and then the other, if necessary, with the flexible wedge 52A compacting the earth in either direction as it is pulled back and forth.

I claim:

1. A service connection between an underground water main outside a building and an above ground shut-off valve within the building, said main including a valve controlled outlet, said connection comprising a flexible leakage conduit extending underground from the main through the wall of the building with an end above ground adjacent said shut-off valve and having a bend between its extremities, a flexible plastic service conduit extending freely and slidably through said leakage conduit, releasable means placing the respective ends of the service conduit in communication with the valve controlled outlet and the shut-off valve, means sealing the respective ends of said leakage conduit to said main and to one end of said service conduit adjacent the shut-off valve, the means sealing the leakage conduit to the main including a vertical casing in the lower end of which the outlet is contained and the upper end of which extends to the surface of the ground, whereby when the means sealing the leakage conduit to the main and the service conduit are released and when the releasable means at both ends of said service conduit are released, said service conduit can be pulled through the leakage conduit and replaced from either end thereof, and an outlet conduit with one end in communication with the end of the leakage conduit adjacent said shut-off valve and extending through said wall with the other end thereof above ground outside the building.

* * * * *